Feb. 16, 1943. J. R. HURLEY ET AL 2,311,545
CONTROL FOR WASHING MACHINES
Filed May 5, 1939 5 Sheets-Sheet 2
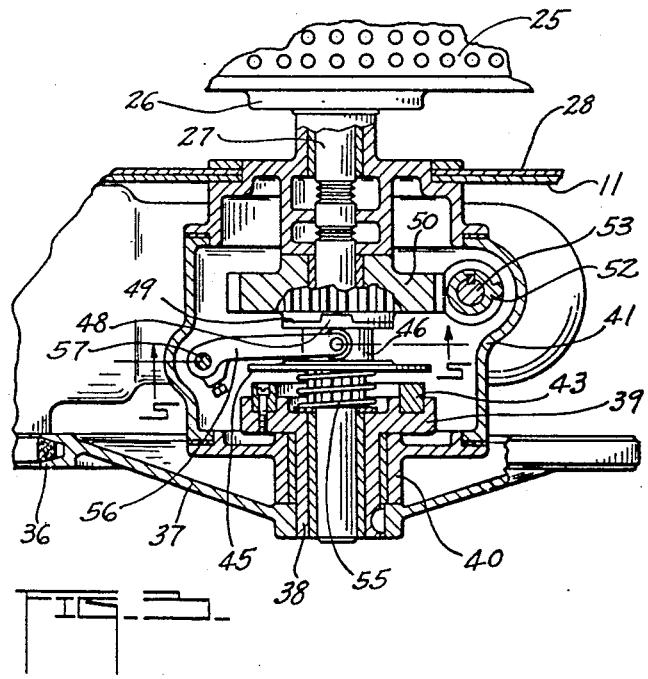
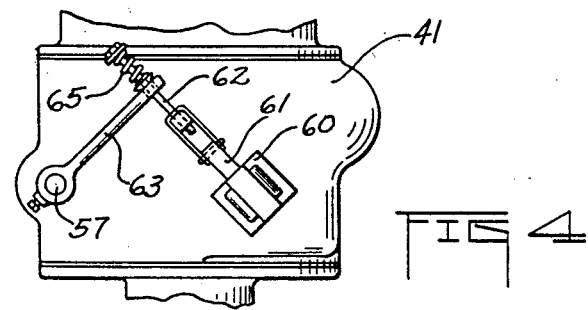
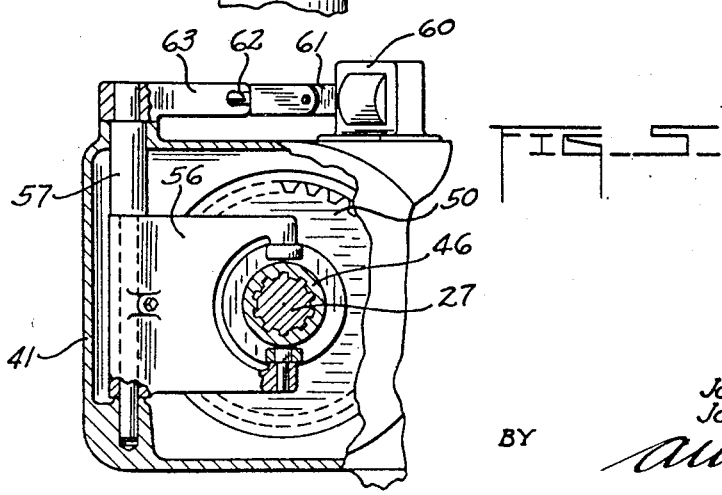
INVENTORS.
John R. Hurley
John P. Beattie
BY
ATTORNEY.

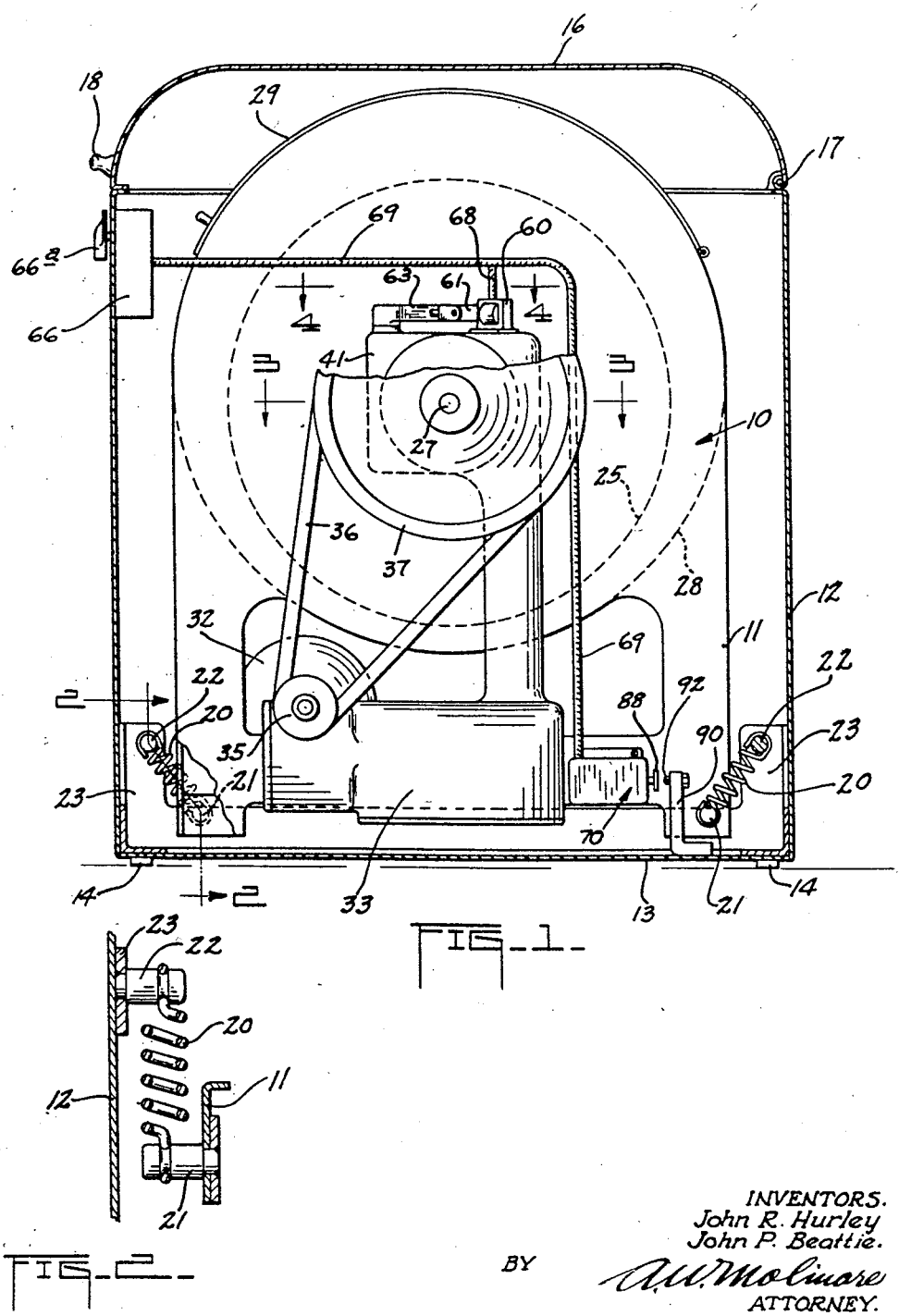

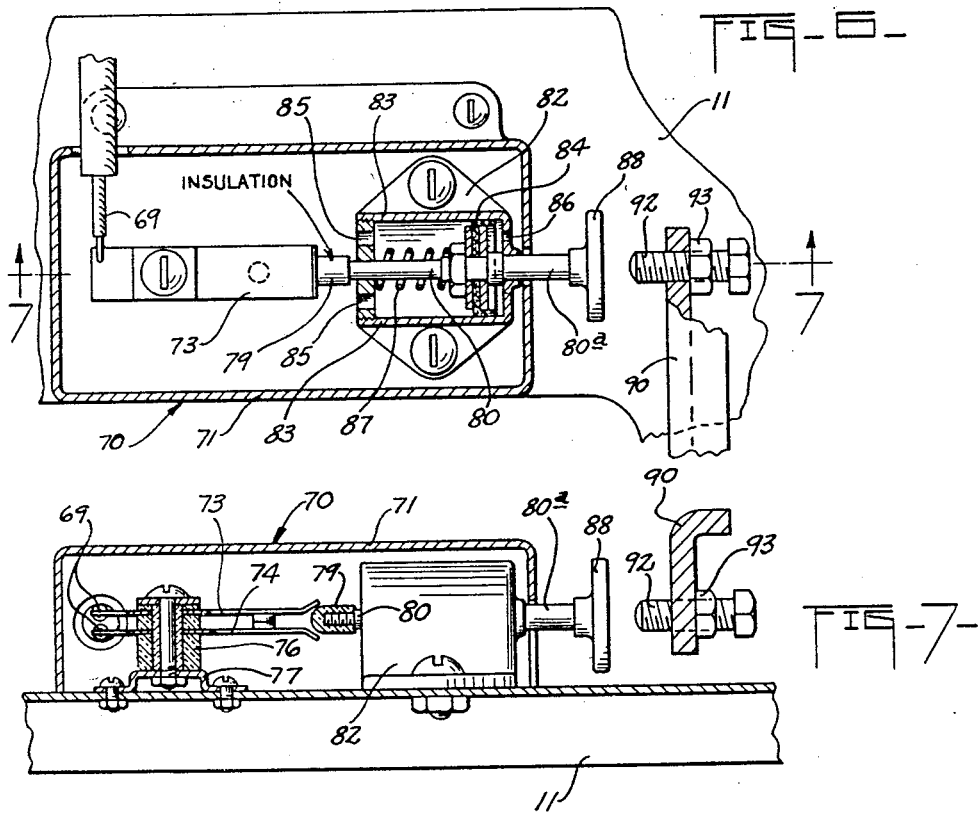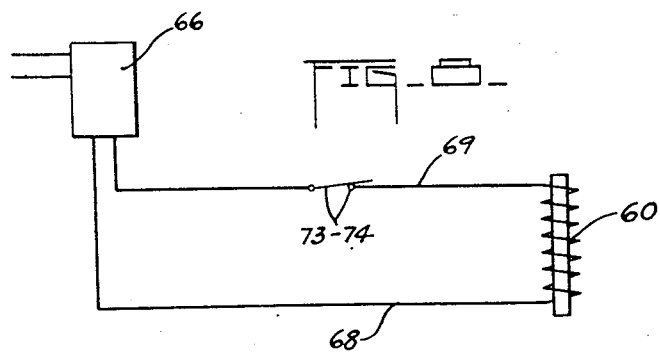

INVENTORS.
John R. Hurley
John P. Beattie
BY
ATTORNEY.

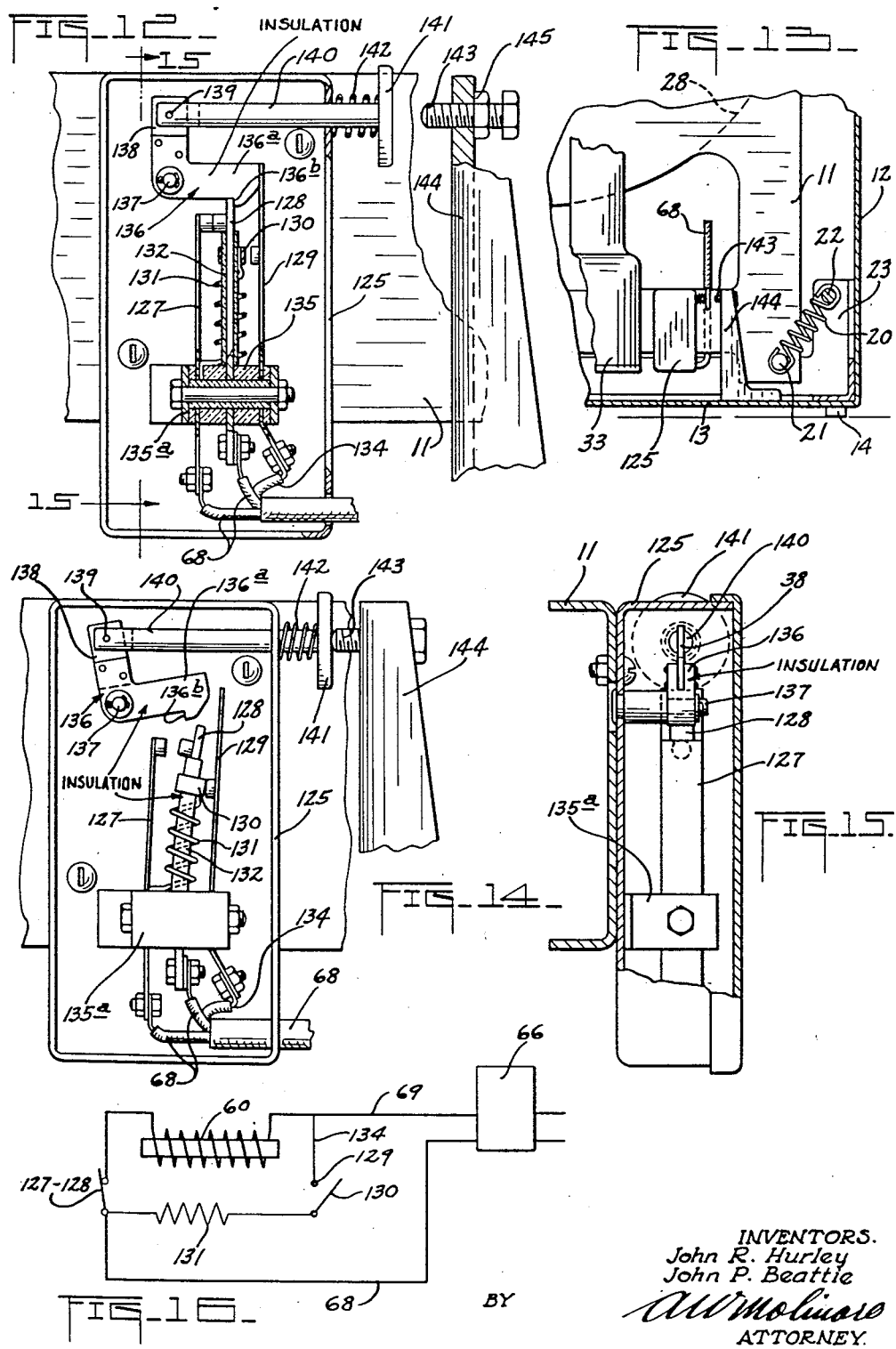

Patented Feb. 16, 1943

2,311,545

UNITED STATES PATENT OFFICE 2,311,545

CONTROL FOR WASHING MACHINES

John R. Hurley, Wheaton, and John P. Beattie, Oak Park, Ill., assignors to Electric Household Utilities Corporation, Chicago, Ill., a corporation of Illinois Application May 5, 1939, Serial No. 271,846

11 Claims. (Cl. 68—12)

The present invention relates to improvements in fabric cleansing and fluid extracting apparatus, and more particularly to apparatus of the type including a rotary cylinder or basket in which the fabrics are contained and rotated at a relatively slow speed for cleansing the fabrics, or at a relatively high rate of speed for centrifugally extracting the cleansing fluid from the fabrics. Apparatus of this general class has heretofore been manufactured as a unitary machine and constructed in a manner for either automatic or semi-automatic operation wherein the cleansing, rinsing, and extracting operations are performed automatically in a predetermined, timed sequence.

In apparatus of this class, more especially of the type adapted for household use, it has been found that in operation, particularly during the high speed rotation of the cylinder or basket in the extracting operation, excessive vibration is developed in the apparatus, which has been found highly objectionable both from the standpoint of unpleasant noise and from possible damage to the apparatus itself and injury to the operator. In connection with some types of apparatus of this general class, it has been necessary to grout the apparatus in place on a concrete floor or rigidly attach it by means of bolts to a wood floor. Even with such mountings, it is well known that in many instances the excessive vibration has totally dislodged the apparatus from the floor. To avoid such conditions, it has also been found necessary to mount the apparatus on a slab of material of relatively great weight in order to prevent the apparatus from becoming loosened from its mountings, and to preclude creeping as well as to preclude the transmission of excessive vibration from the apparatus to the floor proper.

There have been various attempts to obviate the foregoing difficulties, such as by flexibly or resiliently mounting and supporting the machine proper within a casing or enclosure, which, in turn, is then supported upon the floor. Such an arrangement eliminates the necessity of permanent anchorage of the apparatus to the floor, or to a slab of material. Even in such types of apparatus, it is often possible, due to the unbalanced distribution of the fabrics within the rotating cylinder or basket, to produce an unbalanced centrifugal force which results in imparting excessive vibration to the apparatus, and the present invention is particularly directed to improvements in apparatus wherein the machine proper is flexibly or resiliently mounted within a casing.

One of the primary objects of this invention resides in the provision of novel means tending to reduce the vibration set up in the cleansing apparatus of the character indicated, during the operation of the apparatus.

Another object of this invention resides in the provision of control means adapted to be automatically actuated in response to a predetermined amount of vibration of the apparatus, and which functions to temporarily disengage the drive for operating the cylinder or basket at high speed.

A further object of this invention resides in the provision of an improved control of the character indicated, and which is automatically responsive to a predetermined amount of vibration of the apparatus during high speed for centrifugally extracting the cleansing fluid from the fabrics, for temporarily disengaging the drive connections to the cylinder or basket for rotating the same at high or extracting speed for a predetermined interval or period of time, during which drive connections are established for rotating the cylinder or basket at normal cleansing speed.

Still another object of this invention is to provide an improved control for the purpose indicated wherein a solenoid is employed for controlling engagement and disengagement of drive connections for rotating the cylinder or basket at cleansing or extracting speeds and wherein said solenoid is connected in an electrical circuit, including a switch for controlling said circuit, and adapted to be actuated in response to a predetermined amount of vibration of the machine.

Other objects and advantages of this invention will be apparent from the following description, taken in connection with the accompanying drawings, in which:

Fig. 1 is an end view of fabric cleansing and extracting apparatus, having the outer casing or housing broken away to show the machine proper in end elevation, and including the novel control means constituting the present invention.

Fig. 2 is a fragmentary sectional view taken at lines 2—2 on Fig. 1, showing one form of flexible mounting of the machine within the casing.

Fig. 3 is a horizontal section taken at line 3—3 on Fig. 1, showing the driving mechanism for rotating the cylinder or basket.

Fig. 4 is a fragmentary plan view of the housing containing the driving mechanism, showing the solenoid and lever arrangement for controlling said mechanism.

Fig. 5 is an enlarged vertical section through the clutch of the driving mechanism, taken at lines 5—5 on Fig. 3.

Fig. 6 is a vertical section through the novel control mechanism seen in elevation in Fig. 1.

Fig. 7 is a horizontal sectional view through the control mechanism, taken at line 7—7 on Fig. 6.

Fig. 8 is a wiring diagram of the electrical circuit including our novel control mechanism.

Fig. 12 is a vertical section through another modified form of control mechanism.

Fig. 13 is a fragmentary view similar to Fig. 11 but showing the arrangement of the modified control of Fig. 12.

Fig. 14 is a view similar to Fig. 12 showing the position of parts of the modified control mechanism after it has been actuated.

Fig. 15 is a vertical section through the control, taken as indicated at lines 15—15 on Fig. 12.

Fig. 16 is a wiring diagram including the modified form of control shown in Figs. 12 to 15, inclusive.

Figure 9:
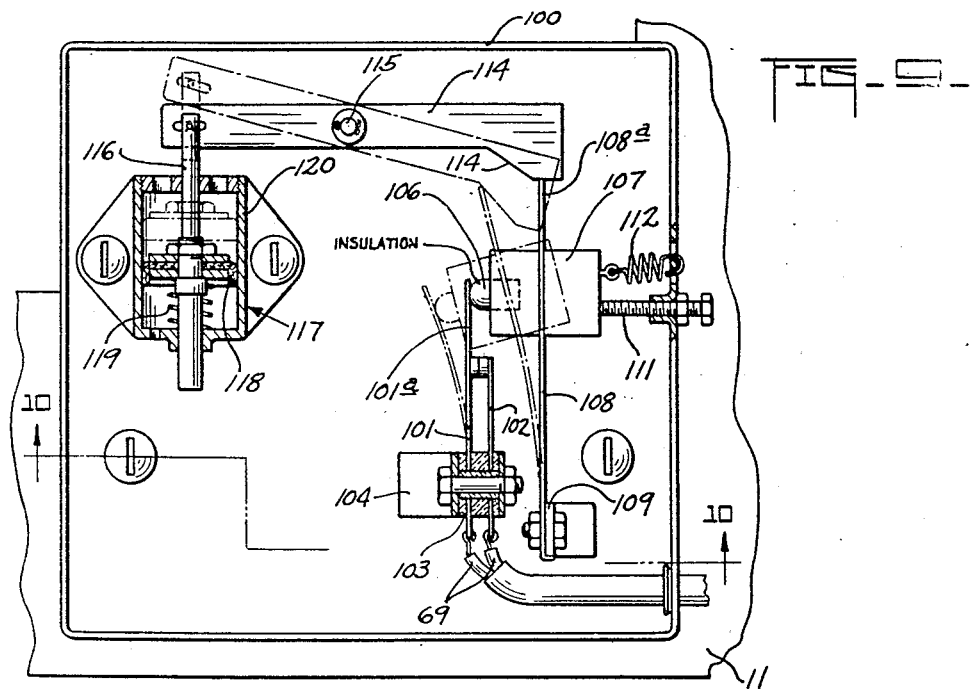
Fig. 9 is a vertical section through a modified form of control unit.

For purpose of illustration, the fabric cleansing and extracting apparatus shown in the drawings includes a unitary machine designated at 10, fully enclosed by a casing 12 of rectangular box-like form, preferably of sheet metal, including a bottom 13, in the corners of which are provided suitable feet or pads 14 for supporting the entire apparatus upon the floor. The upper end of the casing is closed by a top 16, hinged at its rear edge at 17, to the body of the casing, and the opposite end of the cover is provided with a knob or handle 18 for conveniently raising and lowering said cover. The machine proper is flexibly or resiliently mounted within the casing to permit a limited amount of bodily movement thereof during operation. The flexible or resilient mountings may be of various forms, by virtue of which the vibration of the machine proper is not directly transmitted to the casing. The flexible or resilient mounting shown in the drawings comprises two sets of coil springs 20 mounted adjacent opposite ends of the machine, the lower ends of the springs being connected to studs 21 projecting laterally outward from opposite corners of the end frames 11 of the machine and the upper ends of said springs being connected to studs 22 secured to reinforcing angle brackets 23 connected to the end walls of the casing 12.

The machine proper includes a rotatable, perforated cylinder or basket 25, adapted to contain fabrics to be cleansed; said cylinder being provided at its ends with reinforcing flanges 26, rigidly secured to the inner ends of a pair of aligned stub shafts 27 which are carried by the end frames 11 and serve to support and drive said cylinder. The cylinder 25 is normally enclosed in a cleansing fluid container or tub, indicated at 28, connected at its ends to end frames 11. It is to be understood that the cylinder or basket 25 is provided with the usual opening and latch-type closure therefor (not shown) to afford access to the interior thereof for introduction and removal of fabrics. The fluid containing compartment 28 is formed with an opening at its upper end and a hinged cover, as seen at 29, so as to afford access to the perforated cylinder, when the casing cover 16 is raised.

It is to be understood that the machine herein disclosed is of the type wherein the cylinder 25 is adapted to be rotated at a relatively slow speed during the cleansing operation of the fabrics, and at a relatively high or increased speed for centrifugally extracting the fluid from the fabrics. In this connection, it may be understood that suitable controls (not herein shown) may be provided for admitting the cleansing fluid, in fluid container 28, either under manual control or automatically, and for similar discharge of the cleansing fluid from said container.

The mechanism for driving the perforated cylinder 25 includes a motor 32, the shaft of which, it may be understood, is coupled to a worm shaft (not shown), enclosed in a housing 33 containing reversible drive mechanism of the general type shown in Hume Patent No. 1,850,396 which, as hereinafter described, serves to alternately rotate the perforated cylinder 25 a predetermined number of revolutions in opposite directions during the cleansing operation. The end of the worm shaft protrudes beyond the housing 33 and carries a drive pulley 35 which, through the medium of a belt 36, drives pulley 37, which is keyed on a hub 38 of a clutch member 39, which clutch member is journaled on one of the stub shafts 27, and in the hub 40 of the housing 41, which serves to enclose the clutch mechanism and which, in turn, is supported on the adjacent end frame 11. The clutch member 39 is held against axial displacement in an outward direction by the rear face thereof abutting against the inner end of the hub 40. The opposite face of the clutch member is provided with an annular friction facing 43 with which is adapted to cooperate a movable clutch disc 45, carried on a shiftable collar 46, splined on the stub shaft 27. The opposite end of the collar is provided with a jaw clutch member 48, which is adapted to be moved into and out of engagement with a cooperating jaw clutch member 49 formed integrally upon the adjacent face of a gear 50 which is loosely mounted on said stub shaft 27. Said gear is driven by a worm 52 keyed on a vertically disposed shaft 53, the lower end of which extends down into the housing 33 and is driven by the conventional reversing drive mechanism above referred to. A coil spring 55 surrounds the stub shaft and is interposed between the clutch members 39 and 45, normally maintaining said disc 45 out of engagement with clutch member 39, and maintaining the jaw clutch elements 48 and 49 in driving engagement. The dual clutch member including elements 45 and 48 is adapted to be axially moved on the stub shaft 27, by means of a fork or a yoke member 56, rigidly attached to a vertically extending stub shaft 57 which is journaled in the housing 41, as seen in Figs. 3 and 5. It will be apparent that when the stub shaft 57 is moved about its axis in clockwise direction with respect to the showing in Fig. 3, by control means to be hereinafter described, the yoke 56 causes the clutch members 48—49 to be disengaged and clutch member 45 moved into driving engagement with the friction facing 43 of clutch member 39 against the reaction of the coil spring 55.

It will now be apparent that when the dual clutch unit 45—48 is in the position seen in Fig. 3, the reversible drive mechanism enclosed within the housing 33, through the medium of the vertical drive shaft 53 and worm 52 and gear 50, imparts motion to the stub shaft 27 for rotating the perforated cylinder 25, which, as above mentioned, is adapted to be rotated in opposite directions alternately a predetermined number of revolutions. Of course, if desired, the drive mechanism enclosed in the housing 33 could be such as to merely rotate the perforated cylinder 25 in a single direction. It is to be understood that the drive connection just described causes rotation of the basket at a relatively slow speed, during which the fabrics contained within the cylinder 25 are subjected to a cleansing operation. When the yoke 56 has been actuated by control means to be hereinafter described so as to shift the dual clutch members to a position opposite to that shown in Fig. 3, the clutch members 48 and 49 become disengaged, while clutch member 45 engages the friction facing 43 of clutch member 39, and by virtue of which the stub shaft 27 together with the perforated cylinder 25 is then rotated through the drive from the pulley 37 at a relatively high rate of speed, in a single direction, for centrifugally extracting excessive cleansing fluid from the fabrics.

In the construction illustrated, the spring 55 serves to normally maintain jaw clutch members 48—49 in engagement and by virtue of which, as above mentioned, drive connections are provided for rotating the cylinder 25 at slow speed for performing the cleansing operation upon the fabrics. This drive connection, however, may be mechanically broken to establish drive connections between the clutch members 39—45 for rotating the cylinder 25 at a high rate of speed for centrifugally extracting the excessive fluid from the fabrics, and in the construction shown, this action may be automatically effected by means of a solenoid 60, having a core 61 connected to a rod 62, which is resiliently connected to the outer end of a lever 63 secured to the upper end of the yoke shaft 57 carrying the shifter yoke 56; said rod 62 being connected to lever 63 through the medium of a spring member 65, as may be seen in Fig. 4 of the drawings. It is to be understood that the solenoid is connected in an electrical circuit adapted to be completed either by manual manipulation, or automatically under control of suitable timing mechanism which may be understood to be enclosed within the box designated at 66 secured to the inside of the front wall of the casing 12. When the apparatus is of the automatic type, the control mechanism first causes engagement of clutch members 48—49 for a predetermined period for rotating the cylinder 25, at slow or cleansing speed, and after this interval of time, the machine operates for a predetermined rinsing period, after which the control mechanism automatically disengages the slow speed drive, and establishes drive connections for high speed drive of the cylinder for centrifugally extracting excess fluid from the fabrics. Since the timing mechanism does not constitute a direct part of the present invention, detailed illustration or description thereof is believed unnecessary. It may also be understood, however, that, if desired, the timing mechanism enclosed within box 66 may include means for controlling the admission or discharge of the cleansing fluid to the container 28 in a predetermined timed sequence with the cleansing cycle, the rinsing cycle, and extracting cycle of operation of the machine. As may be seen in the drawings, the solenoid 60 is connected in a branch electrical circuit, independently of the motor circuit, and has its conductor wires 68—69 extending into the control box 66 for connection to the time control mechanism therein. A manually adjustable knob 66ª on the outside of the front of the casing 12, as connected to the timing mechanism box 66 for setting the control mechanism for predetermined periods of operation of certain portions of the entire cleansing operation.

It will now be apparent that when the solenoid 60 is energized as a result of completion of its branch circuit through the timing control mechanism within the box 66, the lever arm 63 is actuated to cause shifter yoke 56 to disengage clutch jaws 48—49, and to complete drive connections between clutch members 39—45 for causing rotation of the cylinder 25 at high speed, for centrifugally extracting the excess cleansing fluid from the fabrics. It can be appreciated that even when the machine proper is flexibly or resiliently suspended within the casing 12, it is possible to set up in the machine a relatively strong vibratory action which, to some extent, is also transmitted through the flexible or resilient connections to the casing proper, which results in producing objectionable noise, and also a slight tendency for the total apparatus to creep or walk on the floor. This condition results when the fabrics within the perforated cylinder 25 are more or less bunched or in a mass so that when the cylinder is rotated at high speed, there is produced a definite out-of-balance load condition and it is such condition which sets up the vibration in the machine. Obviously, in a totally automatic machine wherein the various sequences of operation are performed without the aid of human manipulation, there is a possibility of damaging the apparatus in addition to producing highly objectionable noise.

The purpose of the present invention is to overcome in machines of the type referred to, the excessive vibratory condition due to unbalanced load without the necessity of stopping the machine and redistributing the mass of fabric to obtain more uniform balancing of the load; and for this purpose, we provide a novel form of control mechanism, designated generally at 70, which includes a housing 71 in which is contained a switch connected in series in the conductor wire 69 of the solenoid branch circuit, as seen in Fig. 8 of the drawings. This switch includes a pair of normally engaged conductor fingers 73—74 carried on a body 76 of insulating material secured by brackets 77 to one of the end frames 11. The switch members 73—74 are connected to branch conductor wires forming a continuation of conductor wires 69. The free ends of the switch members are bent laterally outward in opposite directions, as seen in Fig. 7, to form cam surfaces for engagement and movement by a head 79 of insulating material secured on the end of a plunger member 80 of a dashpot 82 which, in turn, is secured to the end frame 11, as seen in Fig. 7. The dash-pot includes a cylindrical chamber 83 in which there is disposed a piston 84 carried on the plunger 80, and opposite ends of the dash-pot are provided with port openings 85—86 of conventional size and arrangement to enable the piston to freely move in one direction, and restricting the freedom of movement thereof in the opposite direction due to the size of the port openings, which precludes rapid expulsion of the air within the cylinder when the piston is at one end of its stroke. A spring 87 surrounds the plunger within the chamber and serves to maintain and urge the piston to the position seen in Fig. 6. The plunger includes an extension 80ª protruding through the casing 71 and is provided with an impact head 88. Mounted on the bottom 13 of the casing is a bracket including an upright leg 90 disposed in close proximity to the control 70, and its upper end is provided with a screw 92 disposed in registration with the impact head 88 of the dash-pot. The end of the screw is normally disposed in spaced relation to the end of the dash-pot at a distance which determines the permissible extent of vibration of the total machine before the control mechanism 70 becomes operative. It will be apparent that when the machine proper vibrates within the casing 12 to a sufficient extent to cause the impact head 88 to impinge against the screw 92, the piston 84 in the dash-pot, is moved against the reaction of the spring 87 so that the plunger 80 imparts movement to the head 79 of insulating material for causing separation of the switch members 73—74, thereby breaking the electrical branch circuit including the solenoid 60. When this condition exists, the solenoid, being-deenergized, is immediately returned to the position seen in Fig. 4 through its lever 63 and yoke 56 by the action of coil spring 55, causing instantaneous separation of the clutch members 39—45, and causing disengagement of the high speed drive connection for rotating the cylinder at a rate to centrifugally extract the excess cleansing fluid from the fabrics. This action instantaneously results in re-establishing drive connections through the clutch members 48—49 for driving the cylinder 25 alternately in opposite directions at a slow or normal cleansing speed. This adjustment of the drive connections remains for a temporary predetermined period, which is determined by the time required for the piston of the dash-pot to return to the position seen in Fig. 6, at which time the switch members 73—74 are again engaged to complete the branch electric circuit and re-energize solenoid 60, by virtue of which the clutch elements 48—49 are disengaged, and clutch elements 39—45 re-engaged for driving the cylinder 25 again at high speed for centrifugally extracting the cleansing fluid from the fabrics.

The screw 92, which is threaded into the bracket member 90, is adjustable toward and away from the impact head 88 for varying the permissible amount of vibration of the machine proper within the casing before the control mechanism becomes operative to disengage the high speed drive and re-engage the low speed drive, and the screw 92 may be fixed in a desired position of adjustment with respect to said head 88 by means of a lock nut 93.

Figure 10:
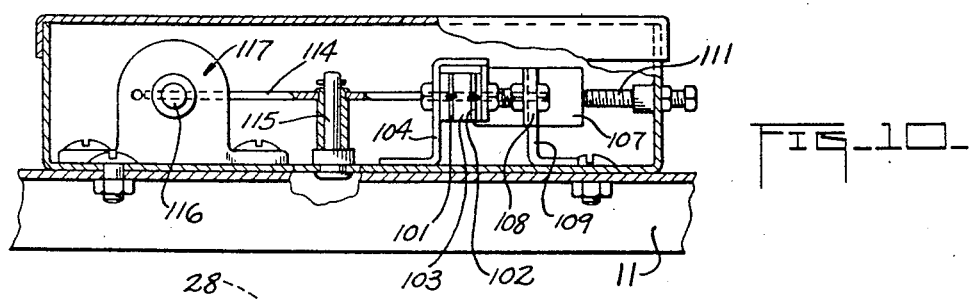
Fig. 10 is a horizontal section taken at lines 10—10 on Fig. 9.
Figure 11:
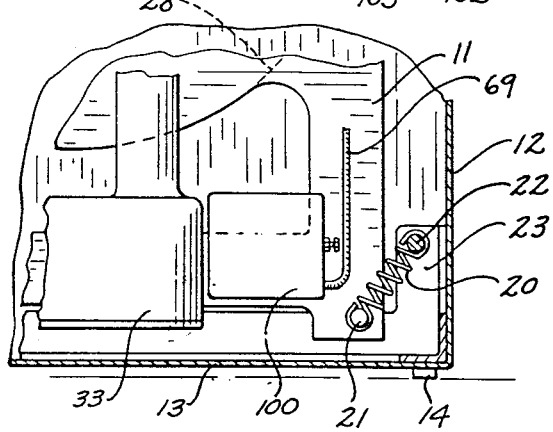
Fig. 11 is a fragmentary view of the machine showing the mounting arrangement of the modified control shown in Figs. 9 and 10.

In the modified form of control disclosed in Figs. 9 to 11, inclusive, the control includes a casing 100 mounted on the end frame 11, as seen in the fragmentary view in Fig. 11, and includes a switch connected in series in the solenoid branch circuit in the same manner as represented in the wiring diagram shown in Fig. 8. The switch includes a pair of cooperating conductor fingers 101 and 102 normally in engaging or closed position and having corresponding ends connected to opposite portions of the conductor wire 69. These switch members are mounted in a body of insulating material 103, carried by a bracket 104 secured to the back wall of the casing 100. The free end of the switch arm 101 includes an extension 101ª adapted to be positioned in registration with a head 106 of insulating material secured to a pendulum weight 107, which is mounted adjacent its middle on an upwardly extending flexible member 108, the lower end of which member is connected to a bracket 109 secured to the back wall of the casing 100. The pendulum weight, due to its flexible mounting, is adapted, when bodily moved, to oscillate back and forth in a pendulum-like manner and is definitely limited in one direction of movement by an adjustable screw 111 secured in the end wall of the casing 100. The weight 107 together with its mounting are yieldingly maintained in the position seen in Fig. 9, with the weight abutting against the end of screw 111 by means of a coil spring 112 connected to the weight and to the end wall of the casing 100. Said member 108 includes an extension 108ª protruding upwardly from the weight 107 and serves as a detent for normally blocking movement in one direction of a lever member 114 pivotally mounted on stud 115, the opposite end of which lever is pivotally connected to plunger 116 of a dash-pot 117 rigidly attached to the back wall of the casing 100. The dash-pot 117 may be understood to be substantially the equivalent of that described in connection with the structure shown in Figs. 6 and 7, and includes a piston 118, a spring 119, normally urging the piston to the free end of the cylinder 120 of the dash-pot, as indicated in dotted lines in Fig. 9. It will be noted that this modified control is in the form of a unitary device totally mounted upon the end frame 11 of the machine proper. When the amplitude and frequency of vibration of the machine obtains a predetermined value, the inertia of the weight 107 tending to remain stationary displaces the detent extension 108ª from beneath the end of lever 114, and the insulated head 106 of the weight engaging the extension of the free end of the switch member 101 causes said switch member to move out of engagement with the switch member 102, thereby temporarily breaking the branch circuit including solenoid 60, which results in disengaging the drive connections for rotating the cylinder 25 at high speed for centrifugally extracting cleaning fluid from the fabric, and re-establishing drive connections for rotating the cylinder at slow speed corresponding to the cleansing speed, as above described. It is to be understood that the circuit including the solenoid remains broken only temporarily for a predetermined interval of time, after which the circuit is re-established, the solenoid re-energized, and driving connections re-engaged for rotating the cylinder at high speed. As above mentioned, this interruption of the high speed drive and restoration of the cylinder to a slower speed drive, results in a redistribution of the fabrics within the cylinder to reduce the out-of-balance load condition and places the cylinder in a better condition of balance, and thereby reducing the extent of vibration of the machine due to centrifugal force. The period of time that the solenoid circuit is broken is under the control of the dash-pot 117. It will be apparent that the piston moves downwardly from the dotted position indicated to the full line position shown, under control of and due to camming action of the end or extension 108ª of the flexible member 108 against the inclined surface 114ª of the lever 114, caused by the action of the spring 112 on the pendulum weight 107, which is carried on the member 108. As the lever 114 is raised to the position seen in full lines in Fig. 9, the head 106 on the weight permits the spring finger 101 to re-establish the circuit connections through switch finger 102, and the extension 108ª then becomes disposed beneath the lever 114 to act as a blocking body or detent for reconditioning the control mechanism.

In the modified form of control mechanism represented in Figs. 12 to 16, inclusive, the control includes a casing 125 mounted on the end frame 11 and includes two switch devices, one of which is connected in series in the circuit with the solenoid 60 in a manner as described in connection with the two above described constructions of control device, and a second switch together with a resistance being connected in shunt around the solenoid in said branch circuit. The first switch includes conductor members 127 and 128 normally in engaged position for completing the branch circuit including the solenoid, and the second switch includes conductor fingers 129 and cooperating terminal 130, the latter being connected to a resistance or heater coil 131 surrounding a body of insulating material 132 enclosing switch finger 128, as seen in Fig. 12. It is to be understood that switch member 128 is formed of a bi-metallic strip of metal and normally, when free, assumes a position such as seen in Fig. 14. The opposite end of the resistance coil 131 is connected to switch finger 127. The conductor wire 69 from the control 66 is connected to the solenoid 60 and thence to the switch comprising fingers 127—128, and thence by conductor wire 68 back to the control 66. The switch finger 129 is connected by conductor 134 to conductor wire 69, and the terminal 130, through the heating resistance coil 131, is connected to conductor 68. The switch fingers 127, 128, and 129 are all mounted at one end in a body 135 of insulating material, which in turn is supported by bracket 135ª, mounted on the back wall of the casing 125.

Both switch fingers 128 and 129 are provided with extensions adapted to cooperate with a bell crank lever 136, pivotally mounted at 137 on the back wall of the casing 125. This bell crank lever includes an arm 136ª of insulating material, the end of which engages the extension of switch finger 129 and normally maintains it out of co-operating relation with contact 130, and the underside of said arm includes a hook portion 136ᵇ adapted to engage the end of the switch finger 128 to temporarily latch it in cooperative relation with switch finger 127, as seen in Fig. 12 to complete the branch circuit. The opposite leg of the bell crank lever, indicated at 138, is pivotally connected at 139 to a horizontally movable plunger member 140, which includes an extension protruding laterally through the end wall of the casing 125 and is provided at its outer end with an impact head 141. The plunger and bell crank lever 136 are urged to the position seen in Fig. 12 by means of a coil spring 142 encompassing the plunger and interposed between the head 141 and the wall of the casing. Disposed in registration with said impact head is an adjustable screw 143, secured in the upper end of a bracket 144 which, in turn, is securely attached to the bottom wall 13 of the casing in substantially the same manner as in the construction disclosed in Figs. 6 to 8, inclusive. Said screw 143 is adjustable toward and away from the impact head 141 to cause actuation of the control when the machine proper vibrates a predetermined amount, and said screw may be secured in any desired position of adjustment by means of a lock nut 145.

It will be apparent that when the impact head encounters adjusting screw 143 it imparts motion to the plunger 140 for moving bell crank lever arm 136 out of latching engagement with switch finger 128, said switch finger, around which the heating coil is mounted, immediately moves to the position seen in Fig. 14 by reason of the fact that said finger is formed of bi-metallic material. In such position of adjustment of finger 128, it causes contact 130 to engage a cooperating contact of switch finger 129 to complete the shunt circuit, including the heater coil 131, and the separation of switch fingers 127—128 results in breaking of the branch circuit including the solenoid 60, which causes readjustment of the driving connections for the cylinder 25, in the same manner as above described. The period of time that the switch fingers 127—128 remain separated, breaking the solenoid circuit, depends upon the time required for the heating coil 131 to act upon the bi-metallic finger 128 for causing same to again straighten out and assume a position at which lever arm 136 of the bell crank may be yieldingly urged by spring 142 into latching engagement with finger 128, for re-establishing the solenoid branch circuit through the switch fingers 127—128, during which action the end of lever arm 136 encounters switch finger 129 for positively maintaining it out of cooperative engagement with contact 130 and thereby maintaining open circuit between finger 129 and contact 130 of the heater shunt circuit.

It is to be understood that in all three forms of the control constituting this invention, as above described, it is possible that the control will operate a plurality of times before the load of fabric in the cylinder 25 becomes properly adjusted to a proper balanced state, so that the vibration of the machine proper, due to centrifugal force, is reduced to at least the minimum established by the adjustment of the control device. This condition, of course, will depend considerably upon the nature of the fabrics in the cylinder. It will be apparent that with certain character of fabrics, such as fabrics of a character that do not possess elongated extensions such as shirt sleeves, apron strings, etc., there is a more ready accommodation or balancing or distribution of the load when the cylinder is cut back from high speed for rotation at slow or cleansing speed as compared with fabrics having such extensions, which tend to become tangled or intertwined with other fabric articles.

Although we have herein shown and described certain preferred embodiments of our invention, manifestly it is capable of further modification and rearrangement of parts without departing from the spirit and scope thereof. We do not, therefore, wish to be understood as limiting this invention to the precise embodiments herein disclosed, except as it may be so limited by the appended claims.

We claim:

1. Apparatus of the character described, comprising in combination, a base structure, a frame mounted on said base, fabric cleansing machinery flexibly supported on said frame for bodily movement in all directions and including a rotatable cylinder, and disengageable driving means for rotating said cylinder, a casing structure supported on the base for enclosing the fabric cleansing machinery, and control means for said driving means comprising an electrical circuit including an electrically energized device operably connected to said disengageable driving means and a switch for controlling said circuit adapted to be actuated in response to a predetermined amount of movement of said machinery relatively to one of said structures for effecting actuation of said device and causing temporary disengagement of said cylinder driving means, said control means including time delay means for causing said control means to operatively reengage said driving means after the lapse of a predetermined interval of time.

2. Apparatus of the character described, comprising in combination, a base structure, a frame mounted on said base structure, fabric cleansing machinery flexibly supported on said frame for bodily movement in all directions and including a rotatable cylinder adapted to contain fabrics to be cleansed, and means for disengageably driving said cylinder at high speed for centrifugally extracting cleansing fluid from said fabrics, a casing structure supported on said base and enclosing said machinery, and control means for said driving means comprising an electrical circuit including an electrically energized device operably connected to said disengageable driving means and a switch for controlling said circuit adapted to be actuated in response to a predetermined amount of movement of said machinery relatively to one of said structures, during high speed rotation of the cylinder, for effecting actuation of said device and thereby temporarily disengaging said driving means, said control means including time delay means for causing said control means to operatively reengage said driving means after the lapse of a predetermined interval of time.

3. Apparatus of the character described, comprising in combination, a base structure, a frame mounted on said base structure, fabric cleansing machinery flexibly supported on said frame and including a rotatable cylinder adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means for selectively engaging said driving connections including cooperating features on said machinery and on one of said structures, adapted to be rendered operative when said machinery moves a predetermined amount in one direction, during high speed rotation of the cylinder, for automatically disengaging the high speed driving connections and engaging the slow speed driving connections.

4. Apparatus of the character described, comprising in combination, a base structure, a frame mounted on said base structure, fabric cleansing machinery flexibly supported on said frame and including a rotatable cylinder adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means for selectively engaging said driving connections including a time delay device and cooperating features on said machinery and on one of said structures, adapted to be rendered operative when said machinery moves a predetermined amount in one direction, during high speed rotation of the cylinder, for temporarily disengaging the high speed driving connections and engaging the slow speed driving connections, and simultaneously actuating the time delay device for limiting the period of disengagement.

5. Apparatus of the character described, comprising in combination, a base structure, a frame mounted on said base structure, fabric cleansing machinery flexibly supported on said frame for bodily movement in all directions and including a cylinder rotatable about a horizontal axis and adapted to contain fabrics to be cleansed, and means for disengageably driving said cylinder at high speed for centrifugally extracting cleansing fluid from said fabrics, a casing structure supported on said base and enclosing said machinery, and control means for said driving means including cooperating features on said machinery and on one of said structures, adapted to be rendered operative when said machinery moves a predetermined amount in one direction, during high speed rotation of the cylinder, for temporarily disengaging said driving means, said control means including time delay means for causing said control means to operatively reengage said driving means after the lapse of a predetermined interval of time.

6. Apparatus of the character described, comprising in combination, a base structure, a frame mounted on said base structure, fabric cleansing machinery flexibly supported on said frame and including a cylinder rotatable about a horizontal axis and adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means for selectively engaging said driving connections including cooperating features on said machinery and on one of said structures, adapted to be rendered operative when said machinery moves a predetermined amount in one direction, during high speed rotation of the cylinder, for automatically disengaging the high speed driving connections and engaging the slow speed driving connections.

7. Apparatus of the character described, comprising in combination, a base structure, a frame mounted on said base structure, fabric cleansing machinery flexibly supported on said frame for bodily movement in all directions and including a rotatable cylinder adapted to contain fabrics to be cleansed, and means for driving said cylinder at high speed for centrifugally extracting cleansing fluid from said fabrics, a casing structure supported on said base and enclosing said machinery, and control means rendered operative when said machinery moves a predetermined amount in one direction for disengaging said driving means, said control means including a time delay device operable incident to said predetermined movement for maintaining said driving means disengaged for a predetermined period of time.

8. Apparatus of the character described, comprising in combination, a base structure, a frame mounted on said base structure, fabric cleansing machinery flexibly supported on said frame for bodily movement in all directions and including a rotatable cylinder adapted to contain fabrics to be cleansed, and means for driving said cylinder at high speed for centrifugally extracting cleansing fluid from said fabrics, a casing structure supported on said base and enclosing said machinery, and control means rendered operative when said machinery moves a predetermined amount in one direction for disengaging said driving means for a predetermined period of time, said control means including cooperating features on said machinery and on one of said structures operable incident to a predetermined amount of movement of said machinery in one direction, for controlling an electrical circuit, a switch in said circuit and operated by one of said features, a solenoid connected in said electrical circuit and operably connected to said driving means, and a dash-pot actuated by said one feature for maintaining said switch in operated position for a predetermined period of time.

9. Apparatus of the character described, comprising in combination, a base structure, a frame mounted on said base structure, fabric cleansing machinery flexibly supported on said frame and including a rotatable cylinder adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means rendered operative when said machinery moves a predetermined amount in one direction, during high speed rotation of the cylinder, for disengaging said high speed driving connections and engaging the slow speed driving connections for a predetermined period of time; after which said driving connections are again reversed, said control means including cooperating features on said machinery and on one of said structures, operable incident to a predetermined amount of movement of said machinery in one direction, for controlling an electrical circuit, a switch in said circuit and operable by one of said features, a solenoid connected in the electrical circuit and operably connected to said driving mechanism, and a dash-pot actuated by said one feature for maintaining said switch in operated position for a predetermined period of time.

10. Apparatus of the character described, comprising in combination, a base structure, a frame mounted on said base structure, fabric cleansing machinery flexibly supported on said frame and including a rotatable cylinder adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means rendered operative when said machinery moves a predetermined amount in one direction, during high speed rotation of the cylinder, for disengaging said high speed driving connections and engaging the slow speed driving connections for a predetermined period of time; after which said driving connections are again reversed, said control means including cooperating features on said machinery and on one of said structures, operable incident to a predetermined amount of movement of said machinery in one direction, for controlling an electrical circuit, a switch in said circuit and operable by one of said features, a solenoid connected in the electrical circuit and operably connected to said driving mechanism, and a dash-pot actuated by said one feature for maintaining said switch in operated position for a predetermined period of time, said dash-pot including a plunger having a head positioned to actuate said switch.

11. Apparatus of the character described, comprising in combination, a base structure, a frame mounted on said base structure, fabric cleansing machinery flexibly supported on said frame and including a rotatable cylinder adapted to contain fabrics to be cleansed and mechanism comprising driving connections for rotating the cylinder at a slow cleansing speed and driving connections for rotating the cylinder at high speed for centrifugally extracting the cleansing fluid from said fabrics, a casing structure mounted on the base and enclosing said machinery, and control means rendered operative when said machinery moves a predetermined amount in one direction, during high speed rotation of the cylinder, for disengaging said high speed driving connections and engaging the slow speed driving connections for a predetermined period of time; after which said driving connections are again reversed, said control means being mounted on said machinery and including an electrical circuit, a normally closed switch in said circuit, a solenoid in said circuit and operably connected to said driving mechanism, a spring pressed plunger mounted for encounter with a fixed cooperating abutment on one of said structures when the machinery moves a predetermined amount in one direction, a bell crank lever actuated by said plunger and normally maintaining said switch in closed position, said switch including a contact finger of bi-metal normally tending to assume a position out of engagement with its cooperating element, a heater coil surrounding the bi-metal contact finger, and a second normally open switch connected with said coil in shunt around said solenoid, whereby opening of the first switch by actuation of the plunger and lever causes closing of the second switch to energize said coil for heating said bi-metal switch finger which after a predetermined period causes said finger to move into engagement with its cooperating finger for closing said first switch and re-establishing the solenoid circuit.

JOHN R. HURLEY.
JOHN P. BEATTIE.